United States Patent [19]
Martin et al.

[11] Patent Number: 5,810,150
[45] Date of Patent: Sep. 22, 1998

[54] COLLATOR FOR A FOOD PRODUCT PACKAGING MACHINE, AND METHOD OF USE THEREOF

[75] Inventors: Gregg A. Martin, Afton; Jimmy L. Meyer, Waynesboro, both of Va.

[73] Assignee: F. R. Drake Company, Waynesboro, Va.

[21] Appl. No.: 623,770

[22] Filed: Mar. 29, 1996

[51] Int. Cl.$^6$ ................................................. B65G 47/24
[52] U.S. Cl. ..................... 198/397; 198/443; 198/473.1
[58] Field of Search .................... 198/397, 434, 198/443, 473.1, 845, 803.14; 221/160–162

[56] References Cited

U.S. PATENT DOCUMENTS

| | | | |
|---|---|---|---|
| 1,194,990 | 8/1916 | Gaynor | 198/473.1 |
| 2,920,743 | 11/1960 | Fradenburgh | 198/443 |
| 3,182,786 | 5/1965 | Reimers | 198/803.14 |
| 3,214,008 | 10/1965 | Warrick | 198/845 |
| 3,342,301 | 9/1967 | Miller et al. | 198/24 |
| 3,503,488 | 3/1970 | Stone | 198/103 |
| 3,601,240 | 8/1971 | Dominici | 198/20 |
| 3,624,773 | 11/1971 | Krooss | 198/397 |
| 3,658,167 | 4/1972 | Zabroski et al. | 198/397 |
| 3,835,985 | 9/1974 | Johnson | 198/397 |
| 3,924,732 | 12/1975 | Leonard | 198/397 |
| 4,082,177 | 4/1978 | Aidlin et al. | 198/443 |
| 4,386,490 | 6/1983 | Griffith et al. | 53/148 |
| 4,662,152 | 5/1987 | Simelands et al. | 53/246 |
| 4,671,042 | 6/1987 | Moekle et al. | 53/122 |
| 4,736,570 | 4/1988 | Handage et al. | 53/443 |
| 4,827,692 | 5/1989 | Fiske et al. | 53/244 |
| 4,921,398 | 5/1990 | Fluck | 414/798.7 |
| 5,057,055 | 10/1991 | Michaud et al. | 452/51 |
| 5,069,019 | 12/1991 | Lodewegen | 53/443 |
| 5,165,218 | 11/1992 | Callahan, Jr. | 53/447 |
| 5,388,385 | 2/1995 | Phelps et al. | 53/247 |

OTHER PUBLICATIONS

F.R. Drake Company, Drake Model 9200 a–Tomatic Loader.
F.R. Drake Company, Drake Model LC–800 a–Tomatic Loader.

*Primary Examiner*—Joseph E. Valenza
*Attorney, Agent, or Firm*—Joseph W. Berenato, III

[57] ABSTRACT

A collator for a food product packaging system includes first and second laterally spaced side frame members. Each frame member has an upper portion and a lower portion. A plurality of interconnected flights form a continuous flight chain. At least some of the flights have a recess extending therealong for receipt of food product. At least three sprockets are rotatably mounted to each of the side frame members. The first and second sprockets are mounted proximate the lower portion of each frame member, and the third sprockets are mounted proximate the associated upper portions. First and second cooperating aligned guides are secured to each frame member and extends substantially between the first and third sprockets. Each guide has sequentially arranged first, second, and third portions. The flight chain is trained about the sprockets and cooperates with the guides so that rotation of the sprockets causes advancement of the flight chain. The first portion of each guide extends from proximate the first sprocket at a first angle for providing a fill zone in which food product may engage the flights and fill at least some of them. The second portion extends at a second angle for permitting food product not seated in a flight to fall away therefrom. The third portion permits food product to stabilize in the flights.

21 Claims, 5 Drawing Sheets

COLLATOR FOR A FOOD PRODUCT PACKAGING MACHINE, AND METHOD OF USE THEREOF

FIELD OF THE INVENTION

The disclosed invention is to a collator used for orienting and aligning otherwise randomly disposed food products prior to the food products being forwarded for packaging in a packaging machine. More specifically, the invention is to a collator and method of use in which the collator has three specifically configured sequentially aligned portions to maximize filling rates of the otherwise randomly disposed food products.

BACKGROUND OF THE INVENTION

Hot dogs, sausages, hamburgers, chicken patties, and other food products typically are prepared by a manufacturer on one piece of equipment, and then loaded into suitable packaging with a separate packaging machine. The food products frequently are delivered to the packaging machine in a random orientation, with the result that the food products must be oriented and aligned prior to being fed into the packaging. A collator is a device which separates and orients randomly spaced and disposed food products, and arranges the food products for delivery to a packaging machine. Because the food products are oriented and aligned, then filling of the packages may proceed relatively efficiently while at the same time minimizing the possibility of packages being underfilled or overfilled.

A typical collator has in the past utilized a series of laterally extending sequentially hingedly connected flights forming a flight chain training about a frame. A collator typically has a loading area which receives the randomly oriented food products, with food product filling some of the flights and overlying others. The flight chain typically proceeds from and through the loading area at a fixed angle to the horizontal of about 40°, with the result that some of the food product overlying the flight chain during an upward advance thereof tends to fall therefrom or else to be removed by rotating paddles. The 40° angle is a compromise between a shallow angle needed to help the product to initially fall into the flights, and a steeper angle needed to remove non-seated food product from the flight chain. Once excess food product has been removed from the flight chain, then the filled flights travel about the collator prior to communicating the now-oriented and spaced food products for distribution to a packaging machine.

Prior art collators are configured with a fixed angle to achieve a trade-off between the most appropriate angle for filling the flights in the loading area and the most effective angle for permitting gravity removal of the food product from overlying the flight chain. Because of that trade-off, however, then not all flights are filled or adequately filled, and rotating paddles are necessary to remove those food products which do not fall from the flight chain by virtue of the effect of gravity. Should the angle be too shallow, then food products will accumulate on the flight chain. Should the angle be too steep, then flights will not be adequately filled.

Moreover, because of consumer preferences, food products today tend not to be shipped hard frozen, so that the rotating paddles may cause damage to relatively soft material. Elimination of the rotating paddles would be particularly advantageous for non-cylindrical products, such as sausage or beef patties.

In addition, because the flight chain moves at a fixed angle to the horizontal as a result of the trade-off between filling and removal, then the collator does not orient as many individual items as otherwise possible and desirable. Production speeds are therefore reduced, thus increasing costs.

Those skilled in the art will understand that there is a need for a collator achieving relatively high production speeds, relatively low product damage rates, handling a broad product range of cylindrical, rectangular, and flat food products, and one which can collate soft product without resulting in its damage.

The disclosed invention achieves these needs and others by providing a collator having first, second, and third sequentially disposed and oriented portions for maximizing the filling rate of the flight chain in the loading area, thereafter maximizing gravity removal of overlying food product, and maximizing product stabilization within the flights prior to passing about the orientation and spacing portion of the collator.

SUMMARY OF THE INVENTION

A collator for a food product packaging machine comprises first and second laterally spaced side frame members, with each member having an upper portion and a lower portion. A plurality of interconnected flights form a continuous flight belt or chain, and at least some of the flights have a recess extending therealong for receipt of food product. At least three support members (e.g. sprockets) are rotatably associated with each of the members. The first and second support members are mounted proximate the lower portion of each frame member, and the third support members are mounted proximate the associated upper portion. First and second cooperating aligned guides are secured to each of the frame members and extend substantially between the first and third support members. The guides each have sequentially arranged first, second, and third portions. The flight chain is trained about the support members and cooperates with the guides so that rotation of the support members causes advancement of the flight chain. The first portion of each guide extends from proximate the first support member or sprocket at a first angle for providing a loading area in which food product may engage the flight belt chain and fill at least some of the flights. The second portion extends at a second angle for permitting food product not seated in a flight to fall away therefrom. The third portion is configured to permit the food product to stabilize within the flights.

A method of collating food products includes the steps of providing a continuous flight chain comprising a plurality of interconnected flights, the flight chain trained about a plurality of rotating sprockets which advance the flights, and at least some of the flights have a recess for receiving food product therein. Food product is supplied to the flight chain. The flights advance at a first angle to the horizontal through the supplied food products so that some of the food products fall within the recesses and other food product rests on the flights. The flights are thereafter advanced at a second angle to the horizontal steeper than the first angle, so that food product resting on flights may fall away therefrom. The flights are thereafter advanced in a third configuration permitting food products in the recesses to stabilize.

These and other objects and advantages of the invention will be readily apparent in view of the following description and drawings of the above-described invention.

DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE PREFERRED EMBODIMENT

Figure 1:
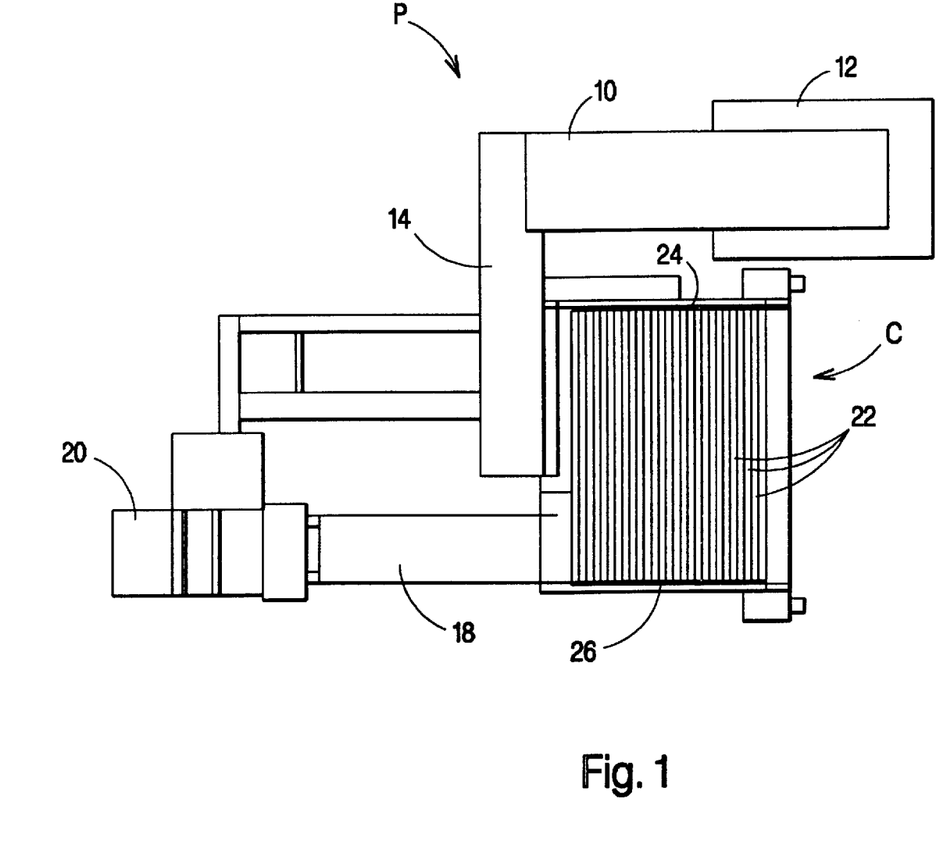
FIG. 1 is a top plan view of a food packaging system incorporating the collator of the invention.
Figure 2:
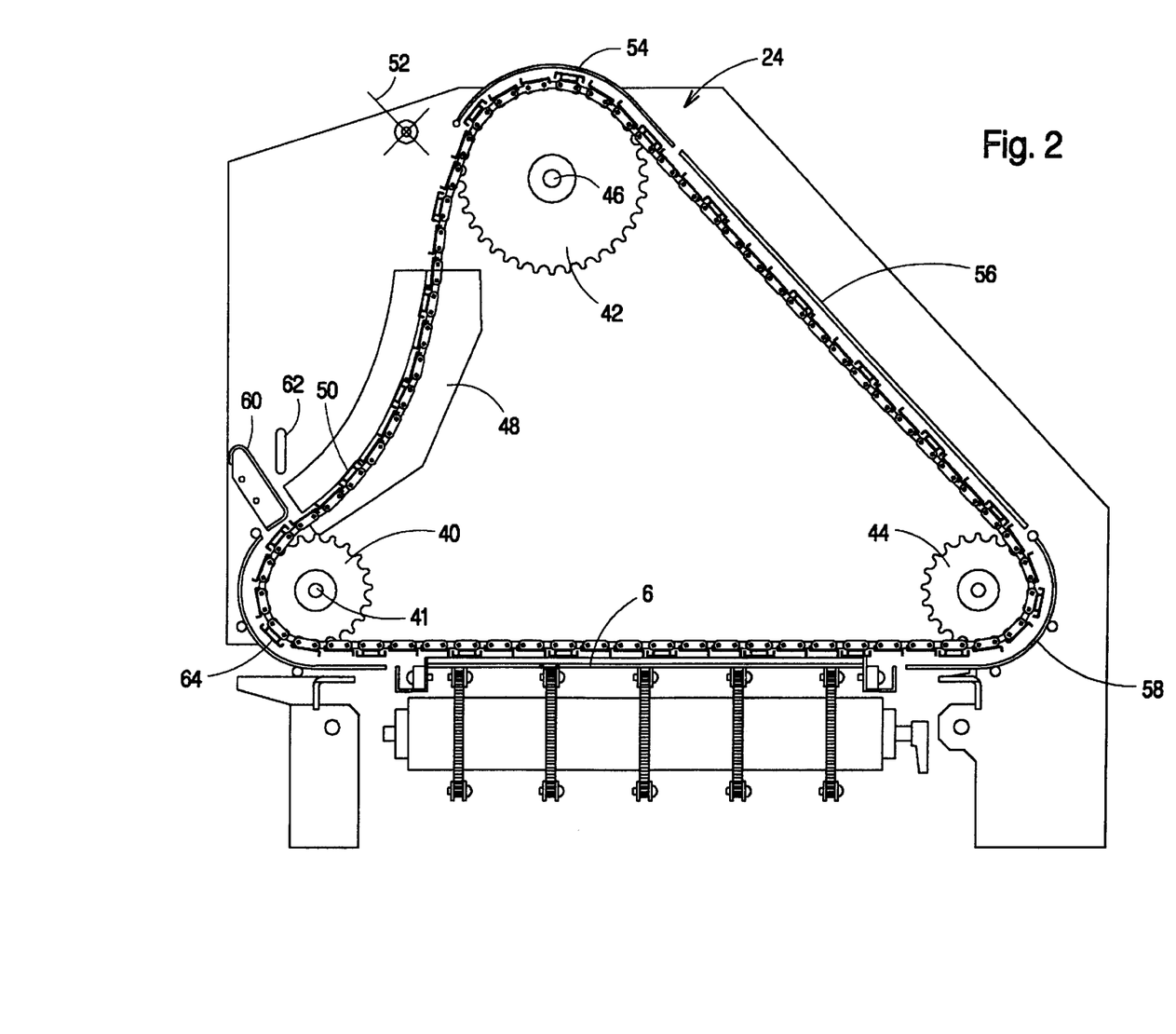
FIG. 2 is a side elevational view of the collator of FIG. 1 with portions broken away for clarity.

Packaging system P, as best shown in FIG. 1, includes an upwardly extending supply conveyor 10 leading from hopper 12 to cross-feed conveyor 14. Food product received in hopper 12 is communicated through supply conveyor 10 to cross-feed conveyor 14, after which the food product falls downwardly into the loading area of collator C. Underlying collator C is a transfer belt 16, as best shown in FIG. 2, which moves food product laterally across the collator C, so that same may be communicated to intermediate conveyor 18. Oriented and spaced food product falls onto intermediate conveyor 18 from collator C because of transfer belt 16, and is communicated to loading head 20 for supply to an appropriate package. The packages may be vacuum packages, gas flush packages, trays, boxes, cartons, or other sorts of packaging used for distributing food products.

Figure 5:
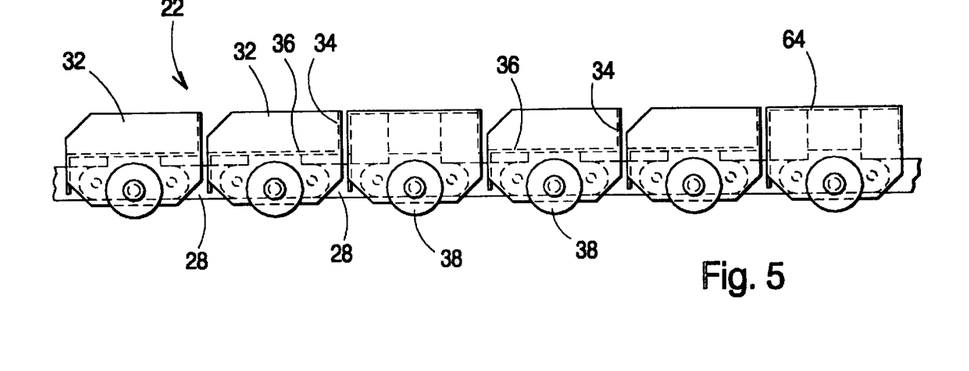
FIG. 5 is a side elevational view of a flight chain according to the invention, with portions shown in phantom.
Figure 6:
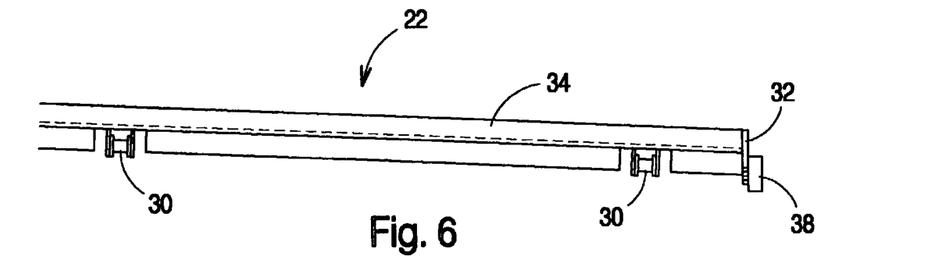
FIG. 6 is a fragmentary front elevational view of a flight of the flight chain of FIG. 5.
Figure 7:
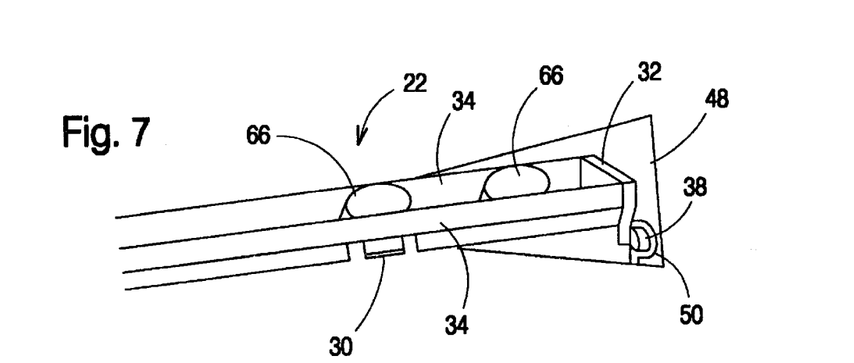
FIG. 7 is a fragmentary perspective view of a flight received within a guide.
Figure 9:
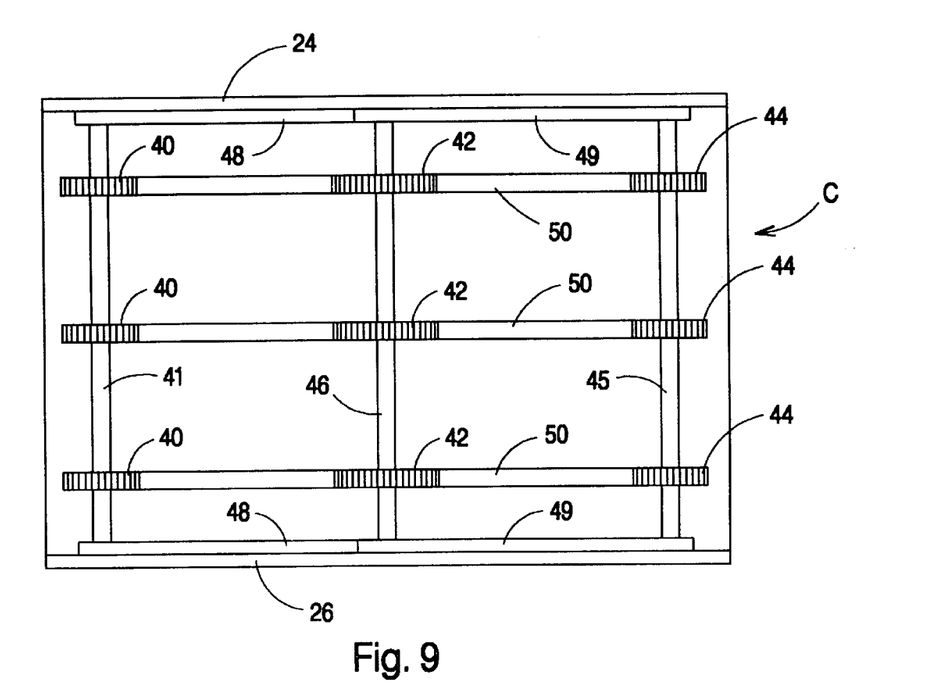
FIG. 9 is a top plan of the collator of the invention with portions removed for clarity.

FIGS. 5, 6, and 7 illustrate flights 22 which are secure by welding to chains SC of FIG. 9 in order to form a continuous flight chain which advances about the collator C, for receiving food product received from cross-feed conveyor 14 and causing same to be oriented and spaced for delivery to intermediate conveyor 18. Each of the flights 22 extends between spaced laterally disposed side frame members 24 and 26 of collator C, as best shown in FIGS. 1 and 9. The flight chain resulting therefrom forms a conveyor system for transporting the food product about the collator C. The flight chain may have as many as 120 flights 22 welded to the chains SC, with the first and last flights 22 being pivotally secured together to form a continuum. Because the links 30 of the chains SC are secured to the flights 22, then the flights 22 may move about the conveyor C as same is operated, as hereinafter explained.

Each of the flights 22 has end wall portions 32 adjacent the frame members 24 and 26. Each flight 22 has a forward wall portion 34 and a floor portion 36. The wall portion 34 cooperates with the floor portion 36 for defining a recess extending substantially the length of each flight 22, with the recess being sized to receive the food product to be handled by the collator C.

Each flight 22 has a roller 38 secured to its opposite ends. Each roller 38 is preferably formed from Delrin®. The flights 22 themselves, as well as essentially all parts of the collator C, are fabricated from stainless steel, polymeric material, or the like, in order to facilitate clean-up in the event of contamination.

FIGS. 2 and 9 illustrate support members or sprockets 40, 42, and 44 rotatably associated with side frame members 24 and 26. Each of the sprockets 40, 42, and 44 is toothed in order to meshingly engage the links 30 of the chains or belts SC for causing the flights 22 to be advanced about the collator C. Preferably the first and second sprockets 40 and 44 are mounted proximate a lower portion of the frame members 24 and 26, with the sprockets 42 mounted proximate an associated upper portion. The sprockets or support members 40 are motor-driven through shaft 41 so that clockwise rotation, as viewed with regard to FIG. 2, causes the flights 22 to advance from the sprockets 40 to the sprockets 42, and then to the sprockets 44 before returning to the sprocket 40. In this way, rotation of the sprocket 40 is utilized to advance the flights about the collator C during operation thereof. The sprockets 42 are mounted to shaft 46 for rotation therewith, while the sprockets 44 are mounted to the shaft 45 for rotation. We prefer that there be three sprockets mounted to each of the shafts, although a greater or fewer number may be utilized.

Figure 3:
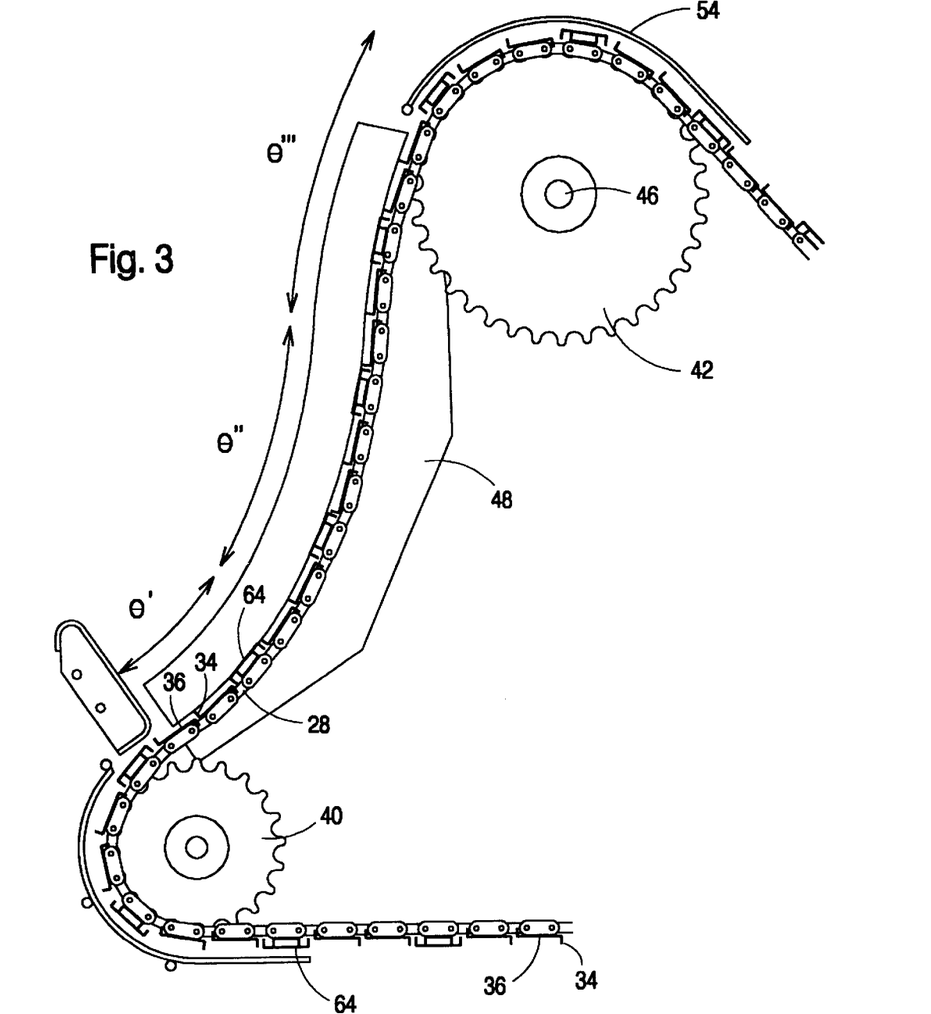
FIG. 3 is a fragmentary elevational view of FIG. 2.
Figure 4:
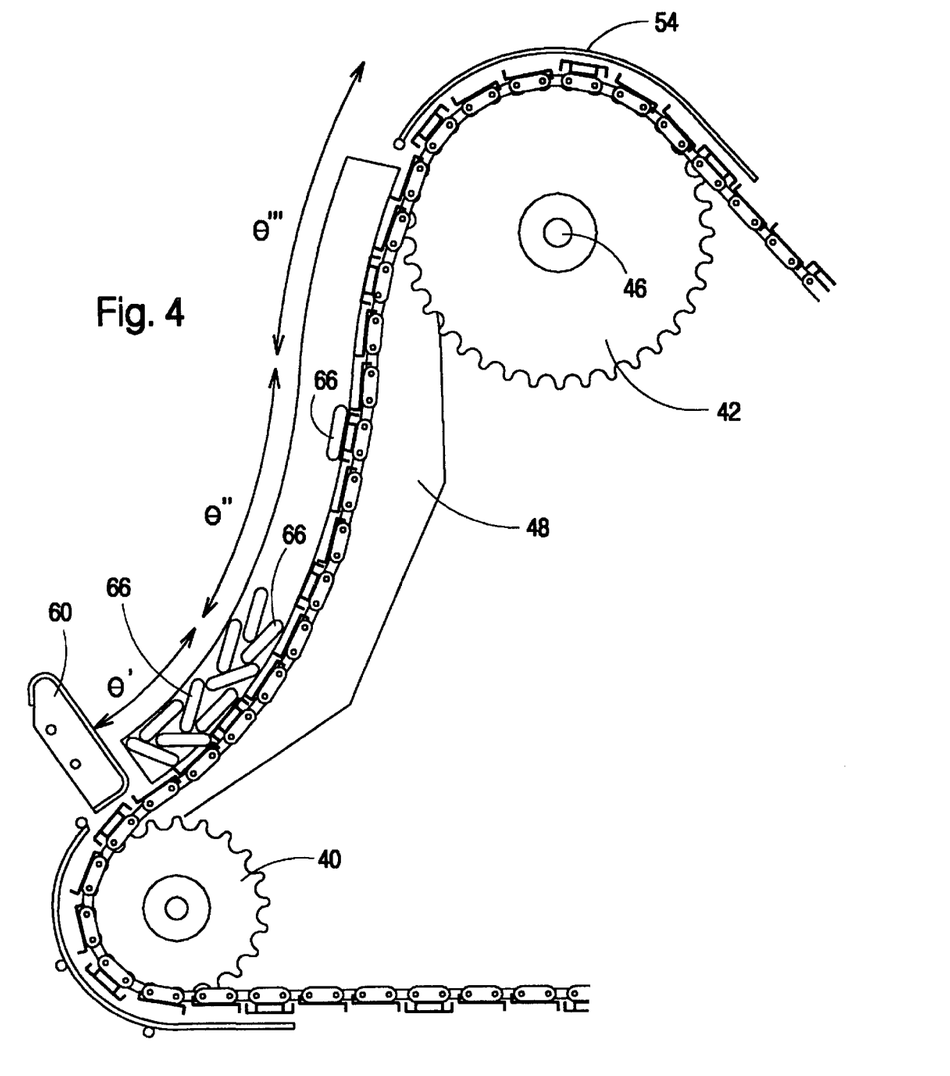
FIG. 4 is a view corresponding to that of FIG. 3, with food product being shown.

FIGS. 2, 3, and 4 illustrate guide member 48 secured to side frame member 24, with a corresponding guide member being secured to the side frame member 26, as best shown in FIG. 9, and cooperating therewith. The guide member 48 extends upwardly from the sprocket 40 to sprocket 42, and has a slot 50 formed therein, as best shown in FIG. 7, in order to receive a roller 38. Preferably, corresponding guide members 49 extend about each of the side frame members 24 and 26 for guiding each flight 22 during its advancement about the collator C, as best shown in FIG. 9. The guide members may be fabricated from ultra high molecular weight polyethylene.

We prefer that the slots 50 have first, second, and third sequentially oriented portions, as best shown in FIGS. 3 and 4, with the first portion A' extending vertically a distance of about 14–15 inches at an angle of from 0° to 30° to the horizontal in order to provide the loading area, with the second portion A" extending vertically a distance of about 20 inches at an angle to the horizontal of about 75° to about 90°, and with the third vertically extending portion A'" feeding the flights 22 onto the sprocket 42 and extending a distance of about 7–8 inches. While the portions are said to extend at an angle to the horizontal, it is to be understood as encompassing an arcuate contour and not necessarily a straight line. This is due in part to the need for portion A' to merge into portion A", portion A" to merge into portion A'", and portion A'" to merge onto the sprocket 42.

The angle to the horizontal at which the first guide portion A' extends is selected in order to provide a shallow angle permitting food product to fill the recesses defined by the wall portions 34 and the floor portions 36 of each flight 22 as it advances through the loading area defined by first portion A'. The second angled portion A" is chosen to have an angle sufficiently steep relative to the horizontal to cause food product lying on a flight 22 but not seated fully in its recess to fall away therefrom, back toward the loading area in the portion A'. The angle chosen for the second portion A" therefore permits the rotating paddle 52 to potentially be eliminated, and certainly minimizes its contact with food products.

Extending about a substantial portion of the sprocket 42 and its overlying flights 22 is a rod assembly 54 which is upstream of rod assemblies 56 and 58. At top speeds, food products may tend to be launched from the flights 22 upon reaching the apex of the upward advance at the sprocket 42, so the rod assembly 54 contains the product within the flights 22. The rod assemblies are disposed above the flights 22, and it is therefore important that food product not overlie the flights 22, or else same may become damaged, may remove other food product which is properly seated in the recesses, or may cause the collator C to jam. The rod assemblies 54, 56, and 58 thus help to maintain the food product within a flight 22 prior to same being permitted to fall onto transfer belt 16 for being moved laterally along a flight 22 in order to be positioned for receipt on intermediate conveyor 18. Alternatively, similar plates or the like may be provided instead of rod assemblies 54, 56, and 58 in order to perform the same function.

The transfer belt 16 pulls food product seated in a recess of a flight 22 from the upper portion of the collator C, as viewed in FIG. 1, to the lower portion, as viewed in FIG. 1, for eventual deposition on intermediate conveyor 18 after passing beyond the end of rod assembly 58.

FIG. 2 illustrates chute 60 which is in communication with cross-feed conveyor 14. Food product moved along conveyor 14 from supply conveyor 10 is thus caused to fall downwardly into the loading area A'. An electric eye 62 may be provided on frame member 24 in order to control operation of the conveyors 10 and 14 as food product fills the flights 22 or falls thereinto as a result of the center of gravity of the food product causing same to fall away from a flight 22 as it advances from sprocket 40 to sprocket 42.

FIGS. 3–5 also illustrate spacers 64 which may be provided overlying a flight 22 in order to preclude food product from being received therein. Spacers 64 may be provided based upon the loading head 20 being used. Spacers 64 assure that food product is delivered to the loading head 20 by the intermediate conveyor 18 only at such times as a package to be filled is available to be filled. Thus, the spacers 64 cause food product discharged by collator C onto intermediate conveyor 18 to be staggered based upon the loading head 20.

FIGS. 4 and 7 illustrate patties 66 supplied to the collator C through chute 60. It can be seen in FIG. 4 that patties 66 are randomly distributed over the flights 22 in the loading area A', with some of the patties 66 overlying the flights 22 in the second region A". In the region A''', however, no patties 66 overlie the flights 22, with the gradual curve of the third region A''' permitting the patties 66 to stabilize in their associated recesses prior to encountering the rod assemblies 54, 56, and 58.

The first portion A' is set at an angle which optimizes the fill rate onto the flights 22 based upon the size and shape of the food product 66. The angle of portion A' is not a compromise angle, such as was utilized with prior collators, and is instead selected to maximize that fill rate. The second portion A" is set at an angle which assures that the center of gravity of the food product will cause same to fall out of the recess of a flight 22 should the food product 66 not be properly seated in the recess of the flight, or to fall away from a flight 22 if overlying same. Because the center of gravity of the food product 66 is used principally for elimination of misseated and overlying food product 66, then mechanical contact, such as through use of the paddles 52, is substantially reduced and the possibility of damage to the product virtually eliminated. The third angled section A''' allows the food product 66 to settle into the recess of the flight 22 prior to entering the rod assemblies. Because of the second portion A" and the third portion A''', then damage to the food product 66 upon entering the rod assemblies 54, 56, and 58 is greatly reduced. Prior to the invention, some of the food product 66 could get past the paddle 52, and could end up being carried into the rod assembly 54. In that event, product damage would increase by affecting the product 66 seated in the recess of a flight 22.

The collator C efficiently collates food products, such as sausages, frankfurters, breadsticks, snacksticks, sausage patties, and beef patties. By collate, we mean to take randomly oriented product from a supply conveyor, such as the conveyor 14, and align the food product 66 into usable rows. The collator C can deliver food product 66 at speeds of up to 3600 pieces per minute, in single or multiple lane configurations.

Figure 8:
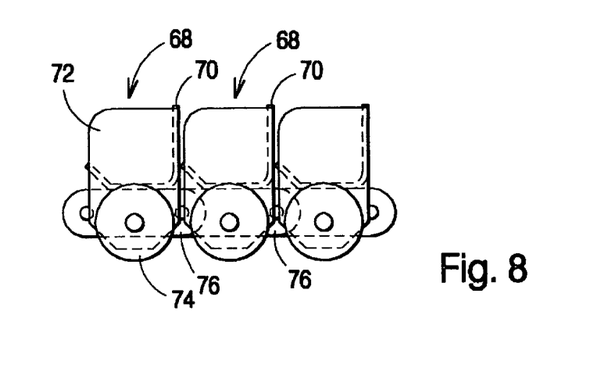
FIG. 8 is a fragmentary side elevational view with portions shown in phantom of a second flight chain according to the invention.

FIG. 8 discloses flights 68 intended for cylindrical food product, unlike the flights 22 which are intended for disk-shaped food product. Each flight 66 has a substantially L-shaped portion 70 defining the recess in which the product is received. As with the flights 22, end portions 72 are provided, and each end portion 72 carries a roller 74 which is received within the slot 50 of the guide members 48. Each flight 68 likewise is connected to the chains SC.

We prefer that the second angled portion A" be set at an angle of substantially 90° to the horizontal when cylindrical product is to be collated and received within the flight 68, while an angle of about 75° to the horizontal should be used when flat product, such as the patties 66, are to be collated with the flights 22. Naturally, other angles may be used based upon the food product to be collated.

While the illustrated preferred embodiment discussed above is provided with sprockets 40, 42, and 44 and chain links for advancing the flights, alternative structures may be used in different embodiments. For example, the sprockets may be replaced with stationary or rotatable non-toothed support members and the chain with a smoothed belt. In such an alternative embodiment, one of the three support members may be driven in order to cause advancement of the belt about all three support members, or alternatively the flight belt may be driven by an external source so as to advance around or about the three stationary support members. Also, while we disclose rods 54, 56, and 58 for maintaining the food product on the flight chain during transit around the collator, same may be provided by flat guides or similar assemblies having a corresponding purpose.

While this invention has been described as having a preferred design, it is understood that the invention is capable of further modifications, uses, and/or adaptations which follow in general the principle of the invention and includes such departures from the present disclosure as come within known or customary practice in the art to which the invention pertains and that may be applied to the central features hereinbefore set forth and fall within the scope of the limits of the appended claims.

What we claim is:

1. A collator for a food product packaging machine having a pocketed conveyor with at least three elongated path portions, comprising:
   a) a plurality of interconnected flights forming a pocketed conveyor;
   b) a first path portion of said conveyor for receiving material to be transported by said conveyor, said first path portion having an arcuate contour in elevation between a lower material receiving section and an elevated upper transition section, said arcuate contour including at least three radii of curvature with no planar portion and the third radius directed oppositely to the first and second radii;

c) a second path portion of said conveyor downstream of said upper transition section, said second path portion extending vertically downwardly from said upper transition section;

d) a third path portion of said conveyor downstream of said second path portion and continuing to said first path portion, said third path portion running generally horizontally and defining a lower discharge section; and e) a horizontally extending transport conveyor disposed below said third path portion and extending parallel and perpendicular thereto for transporting material discharged from said lower discharge section in a conveyance direction perpendicularly away from said third path portion.

2. The collator of claim 1, wherein:

a) said first radius of curvature defines said lower material receiving section.

3. The collator of claim 2, wherein:

a) said material receiving section extends at an angle of between about 0° to about 30° degrees to the horizontal.

4. The collator of claim 1, wherein:

a) said second radius of curvature defines a section permitting food product not seated in a flight to fall away therefrom.

5. The collator of claim 4, wherein:

a) said falling away section extends at an angle from about 75° to about 90° to the horizontal.

6. The collator of claim 5, wherein:

a) said falling away section extends at an angle of 75° to the horizontal when the food product is flat and at an angle of 90° to the horizontal when the food product is cylindrical.

7. The collator of claim 2, wherein:

a) said second radius of curvature defines a section permitting food product not seated in a flight to fall away therefrom.

8. The collator of claim 1, wherein:

a) each of said flights has a recess spanning the length thereof; and b) an end member closes each recess at the ends thereof.

9. The collator of claim 8, wherein:

a) a spacer closes some of said flights and precludes food product from being seated therein.

10. The collator of claim 1, wherein:

a) a plurality of rods are disposed above said conveyor, some of said rods are positioned about said transition section and some of said rods are disposed about third path portion upstream of said lower discharge section.

11. The collator of claim 10, wherein:

a) some of said rods extend above said conveyor the length of said second path portion.

12. The collator of claim 11, wherein:

a) said second path portion extends angularly downwardly and away from said first path portion.

13. The collator of claim 1, wherein:

a) each of said flights is L-shaped in elevation.

14. The collator of claim 1, wherein:

a) a rotating paddle is disposed above said conveyor upstream of said upper transition section.

15. A collator for a food product packaging machine, comprising:

a) a plurality of interconnected flights comprising a pocketed conveyor, each of said flights being L-shaped in end elevation;

b) first, second, and third sprockets, said first and third sprockets rotating about axes extending along a lower horizontal plane and said third sprocket rotating about an axis spaced between and disposed above the axes of said first and third sprockets;

c) said conveyor trained about said sprockets for thereby defining first, second, and third elongated path portions along which food product is transported;

d) said first path portion extends between said first and second sprockets and has an arcuate contour in elevation defined by at least three radii of curvature and no planar portion with the third radius of curvature directed oppositely to the first and second radii of curvature, the first radius of curvature defining a lower material receiving section, the second radius of curvature defining a section permitting food product not seated in a flight to fall away therefrom, and the third radius of curvature defining a settling section upstream of said second sprocket;

e) said second path portion extends vertically angularly downwardly from said second sprocket to said third sprocket; and f) said third path portion extends horizontally between said first and third sprockets, said third path portion including a discharge section from which food product carried by said conveyor is discharged.

16. The collator of claim 15, wherein:

a) a plurality of rods are disposed above said conveyor and extend between said second and third sprockets for preventing food product seated in said flights to be removed therefrom while being transported along said second path portion.

17. The collator of claim 16, wherein:

a) some of said rods extend about said second sprocket toward said first path portion and some of said rods extend about said third sprocket along a portion of said third path portion.

18. The collator of claim 17, further including:

a) a transfer conveyor disposed below said third path portion and extending perpendicularly thereto for receiving discharged food product and conveying same away therefrom.

19. The collator of claim 18, wherein:

a) a plurality of second rods are disposed above said conveyor about said first sprocket, and said transfer conveyor is disposed between said second rods and said first mentioned rods disposed about said third sprocket.

20. The collator of claim 15, wherein:

a) a rotary paddle is disposed above said conveyor upstream of said second sprocket for removing food product not seated in a flight.

21. A method of collating food products, comprising the steps of:

a) providing a pocketed conveyor comprising a plurality of interconnected flights, the conveyor trained about a plurality of rotating sprockets that advance the flights along three elongated paths and at least some of the flights having a recess in which to receive food products;

b) supplying a plurality of food products to be collated;

c) advancing the flights vertically angularly upwardly along the first elongated path, the first path having an arcuate contour in elevation defined by three radii of curvature and the third radius of curvature directed oppositely to the first and second radii, the first radius defining a section in which food product may be received within the flights, the second radius defining a section permitting food products not seated in a flight to fall away therefrom, and the third radius defining an upper transition section;

d) advancing the flights and food product carried thereby vertically angularly downwardly along the second path between the second and third sprockets; and e) advancing the flights horizontally along the third path and thereby permitting food product to be discharged vertically downwardly.

\* \* \* \* \*